Patented July 21, 1936

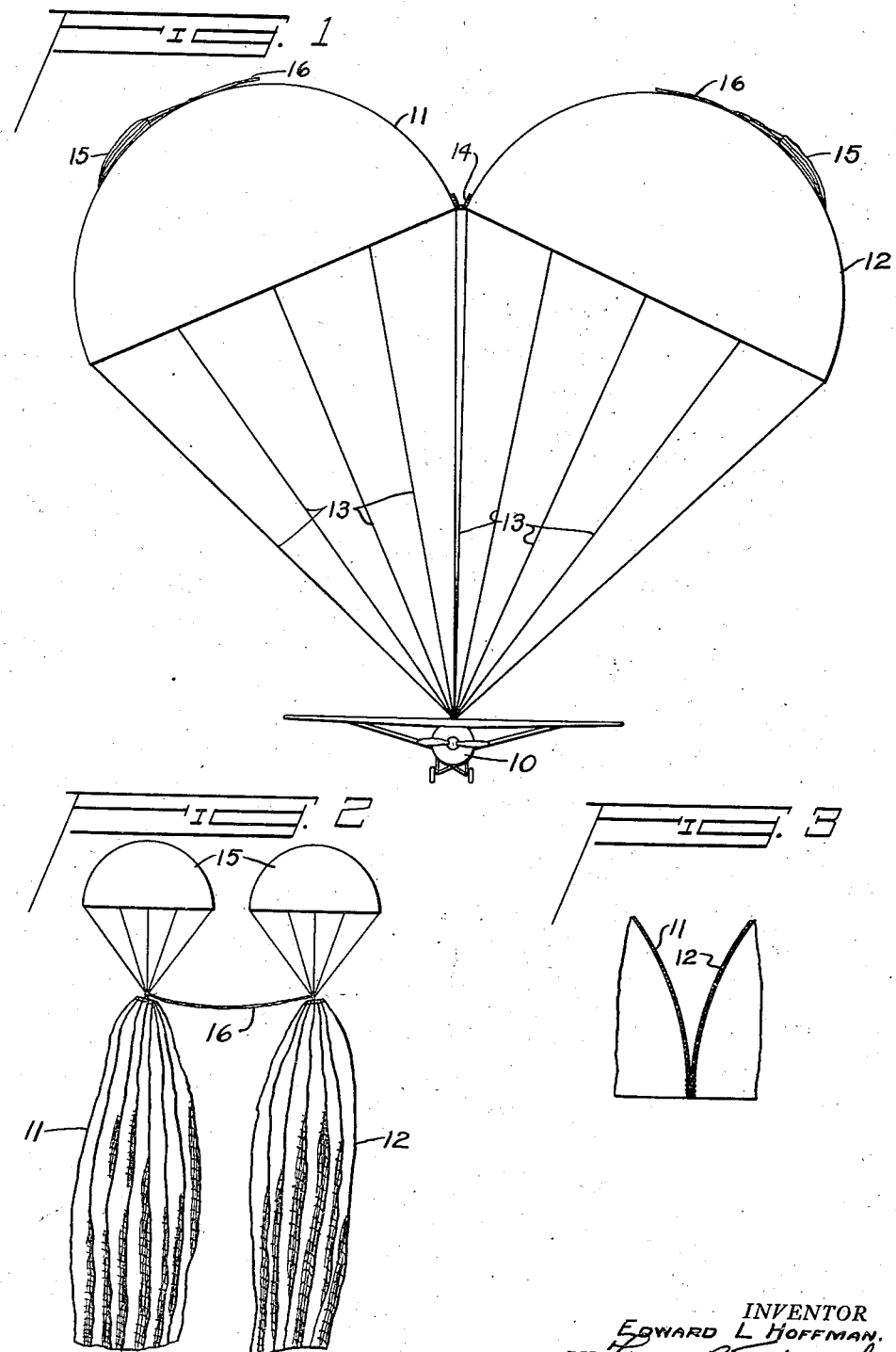

2,048,159

UNITED STATES PATENT OFFICE 2,048,159

MULTIPLE PARACHUTE ARRANGEMENT

Edward L. Hoffman, Dayton, Ohio

Application January 10, 1933, Serial No. 651,017

5 Claims. (Cl. 244—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to quick opening parachutes, and particularly to large sized parachutes for bringing entire aircraft or the like safely to earth.

The principal object therefore of my invention is to provide a parachute mechanism that will open in a minimum amount of time and space, and when once in an open condition will be of suitable efficiency. More specifically the object of this invention is to provide a parachute arrangement having a multiple of main canopies with the skirts of the canopies or their adjacent parts secured together.

A still further object of my invention is to provide a parachute of multiple canopies that is so constructed and arranged that the pilot parachutes of the same are highly effective.

A still further object of this invention is to provide a multiple canopied parachute that strings out after release and before opening similar to single canopied parachutes.

A still further object of my invention is to provide an efficient parachute of multiple canopies that is economical in manufacture and durable in use.

These and other objects will be apparent to those skilled in the art.

My invention consists in the construction, arrangement and combination of the various elements of the device, whereby the objects contemplated are attained as hereinafter more fully set forth, pointed out in my claims, all illustrated in the accompanying drawing, in which:

Fig. 1 is a side view of my parachute in an open condition for lowering an airplane or load safely to earth;

Fig. 2 is a side view of the upper portions of my device after release with both pilot parachutes open and just before the two main canopies start to open; and Fig. 3 is a cross-sectional view of the adjacent portions of two parachute canopies showing one way of securing their skirt or marginal portions together.

In experimenting with large parachutes for bringing down large loads, such as entire airplanes, I find that single canopied parachutes string out to undesirable lengths before opening. In the case of eighty-foot parachutes the pilot parachute strings out twelve feet, the main canopy strings out forty feet and the suspension lines string out sixty feet, making a grand total of one hundred and twelve feet. In many instances this loss of valuable altitude is a serious matter and also requires an excessive period of time. To overcome such disadvantages I employ a multiple of smaller main canopies to replace the single large main canopy. By multiple, I have in mind two or more canopies and, although in the drawing I illustrate only two main canopies, I do not desire to limit myself to this number. Naturally when a plurality of canopies is used their diameter will be much less than the diameter of the single canopy they replace. This means that the number of feet the parachute mechanism strings out before opening will be greatly reduced, thereby saving both altitude and time of opening.

Tests of multiple canopied parachutes, however, show an undesirable substantial loss in efficiency over single canopies of similar effective areas. The chief reason for this is that each of the multiple canopies float at an angle of approximately ninety degrees to each other, or approximately at angles forty-five degrees to the vertical. This deploying of the canopies means that much valuable lift is lost due to the reduced projected effective area of the parachute. To overcome a substantial amount of this loss I secure the skirts or adjacent parts of the canopies together, thereby preventing the spreading of the canopies from each other and holding them to float at a lesser angle to the horizontal with increased effective projected area.

Referring to the drawing I have used the numeral 10 to designate the load object. The numerals 11 and 12 designate the two main canopies of my parachute. The numeral 13 designates the suspension cords extending from the canopies 11 and 12 to the load object.

I have used the numeral 14 to designate a connecting member for linking the skirts or adjacent portions of the canopies together, as shown in Fig. 1. Any desirable securing means, however, may be used and in Fig. 3 I show the adjacent portions of the canopies stitched, sewed or otherwise secured together.

The numeral 15 designates a small pilot parachute secured to the upper portion of each of the canopies 11 and 12. In order that the two main canopies 11 and 12 will properly hold together and string out after release and before inflation similar to a single canopy, I connect their upper portions together by a frangible link member 16. As this member 16 is of low tensile strength it will break immediately upon the opening of the canopies 11 and 12, as shown in Fig. 1. With the upper portions of the canopies 11 and 12 to hold together at points near the points where the pilot parachutes are secured to the main canopies, respectively, the pilot parachutes will inflate in the usual manner and be highly effective.

Although my device is particularly designed for lowering large load objects, it may be also built to lower relatively light loads.

Some changes may be made in the construction of my parachute without departing from the real spirit and purpose of my invention and it is my intention to cover by my claims any modified forms of structure, or use of mechanical equivalents which may be reasonably included in their scope.

I claim:

1. In a parachute, a plurality of main canopies having their adjacent marginal edges fixedly secured together, a pilot parachute secured to the top portion of each of said canopies, and suspension cords leading from said canopies.

2. In a parachute, a multiple of main canopies symmetrically and angularly disposed about the axis of pull of a load object, having their adjacent skirt portions secured together, suspension lines for each of said canopies leading individually to said load object, a frangible means for securing the upper portions of said canopies together, and a pilot parachute secured to the upper portion of one of said canopies.

3. In a parachute, a multiple of main canopies symmetrically and angularly disposed about the axis of pull of a load object, suspension cords leading individually from each of said canopies to said load objects, a frangible member for securing the upper portions of said canopies to each other, and a pilot parachute secured to the upper portion of each of said canopies.

4. A parachute arrangement comprising, a plurality of main canopies symmetrically and angularly disposed about the axis of pull of a load object, pilot parachutes for opening said main parachutes, sets of suspension lines extending from each of said canopies to said load object and frangible means for securing the upper portions of said main canopies to one another.

5. In a parachute apparatus, a multiple of main canopies symmetrically and angularly disposed about the axis of pull of a load object, a pilot parachute for opening each main parachute, suspension cables leading from each of said canopies to said load object, nonbreakable means for fixedly securing the marginal edge portions of said canopies in substantially contiguous relationship, and breakable means for separably connecting the central portions of said canopies to one another.

EDWARD L. HOFFMAN.